United States Patent
Krondorfer et al.

(10) Patent No.: US 8,756,752 B2
(45) Date of Patent: Jun. 24, 2014

(54) TANK TRAY FOR AN EXTRACTOR CLEANING MACHINE

(75) Inventors: Harald Krondorfer, Aurora, OH (US); Robert A. Salo, Mentor, OH (US); Euan Macleod, Hung Hom (HK); Patrick Quinn, North Canton, OH (US); John Bantum, Munroe Falls, OH (US)

(73) Assignee: Techtronic Floor Care Technology Limited, Tortola (VG)

( * ) Notice: Subject to any disclaimer, the term of this patent is extended or adjusted under 35 U.S.C. 154(b) by 154 days.

(21) Appl. No.: 13/223,964

(22) Filed: Sep. 1, 2011

(65) Prior Publication Data

US 2012/0066858 A1    Mar. 22, 2012

Related U.S. Application Data (60) Provisional application No. 61/379,209, filed on Sep. 1, 2010.

(51) Int. Cl.
  *A47L 7/00* (2006.01)
  *A47L 11/40* (2006.01)

(52) U.S. Cl.
  CPC ........... *A47L 11/4016* (2013.01); *A47L 7/0004* (2013.01); *A47L 7/0019* (2013.01)
  USPC .......................................................... 15/320

(58) Field of Classification Search
  CPC . A47L 11/4016; A47L 7/0004; A47L 7/0019; A47L 5/00
  USPC .................................................... 15/320, 302
  See application file for complete search history.

(56) References Cited

U.S. PATENT DOCUMENTS

| | | | |
|---|---|---|---|
| 4,819,676 A * | 4/1989 | Blehert et al. | 134/21 |
| 5,406,673 A | 4/1995 | Bradd et al. | |
| 5,493,752 A * | 2/1996 | Crouser et al. | 15/321 |
| 5,615,448 A | 4/1997 | Crouser et al. | |
| 5,784,755 A | 7/1998 | Karr et al. | |

(Continued)

FOREIGN PATENT DOCUMENTS

| | | |
|---|---|---|
| CA | 2204312 | 5/2001 |
| JP | 5228075 | 9/1993 |
| KR | 100761762 | 10/2007 |

OTHER PUBLICATIONS

PCT/US2011/050201 International Search Report and Written Opinion dated Feb. 9, 2012 (9 pages).

*Primary Examiner* — Bryan R Muller
(74) *Attorney, Agent, or Firm* — Michael Best & Friedrich LLP (57) ABSTRACT

An extractor cleaning machine including a base or foot movable along a surface to be cleaned and a handle pivotally coupled to the foot for movement between an upright position and a reclined position. The handle includes a tank tray having an inlet and a drain. A channel communicates with the drain and extends away from the tank tray. A distributor communicates with the inlet and is operable to distribute cleaning fluid to the surface. A supply tank is removably coupled to the handle and has an outlet in fluid communication with the inlet when the supply tank is coupled to the handle. The supply tank is at least partially supported by the tank tray and the tank tray is configured to collect fluid spilt from the supply tank and to divert the fluid away from the tank tray by way of the channel.

25 Claims, 5 Drawing Sheets

(56) References Cited

U.S. PATENT DOCUMENTS

| | | |
|---|---|---|
| 5,839,159 A | 11/1998 | Karr et al. |
| 6,082,376 A | 7/2000 | Karr et al. |
| 6,154,917 A | 12/2000 | Zahuranec et al. |
| 6,295,695 B1 | 10/2001 | Park |
| 6,536,071 B2 | 3/2003 | Zahuranec et al. |
| 6,725,498 B2 | 4/2004 | Symensma et al. |
| 7,159,271 B2 | 1/2007 | Sepke et al. |
| 7,331,082 B2 | 2/2008 | Hertrick et al. |
| 7,617,563 B2 | 11/2009 | Hertrick et al. |
| 7,814,612 B2 | 10/2010 | Sepke et al. |
| 7,870,637 B2 | 1/2011 | Parr et al. |
| 7,945,989 B2 | 5/2011 | Sepke et al. |
| 2006/0123587 A1* | 6/2006 | Parr et al. .................. 15/320 |
| 2009/0229069 A1* | 9/2009 | Lenkiewicz et al. ............ 15/320 |

* cited by examiner

TANK TRAY FOR AN EXTRACTOR CLEANING MACHINE

CROSS-REFERENCE TO RELATED APPLICATION

This application claims the benefit of and priority to U.S. Provisional Patent Application No. 61/379,209, filed Sep. 1, 2010, the entire contents of which are hereby incorporated by reference.

BACKGROUND

The present invention relates to extractor cleaning machines and, more particularly, to tank trays for extractor cleaning machines.

SUMMARY

In some embodiments, the invention provides an extractor cleaning machine including a base movable along a surface to be cleaned and a handle pivotally coupled to the base for movement between an upright position and a reclined position. The handle includes a tank tray having an inlet and a channel communicating with and extending away from the tank tray. A distributor communicates with the inlet and is operable to distribute cleaning fluid to the surface. A supply tank is removably coupled to the handle and has an outlet in fluid communication with the inlet when the supply tank is coupled to the handle. The supply tank is at least partially supported by the tank tray and the tank tray is configured to collect fluid spilt from the supply tank and to divert the fluid away from the tank tray by way of the channel.

A drain can be located adjacent a rear of the tank tray and can communicate with the channel. When the handle is moved from the upright position to the reclined position, fluid collected in the tank tray can move toward the drain. The handle can include a groove communicating with the channel. The groove can extend generally downwardly and can diverge away from the handle. The tank tray can also include an inner wall surrounding the inlet. The inner wall can be continuous and can substantially divide the tank tray into a first volume outside of the inner wall and communicating with the channel, and a second volume inside of the inner wall and communicating with the inlet. The inner wall can substantially inhibit fluid collected within the first volume from reaching the second volume. The inner wall can define notches along an upper edge thereof that can allow fluid to flow over the inner wall. The distributor can be positioned directly below and in close proximity to the inlet.

In other embodiments, the invention provides an extractor cleaning machine including a base movable along a surface to be cleaned and having a distribution nozzle and a suction nozzle. A handle is coupled to the base to facilitate movement of the base along the surface. The handle is pivotally coupled the base such that the handle pivots with respect to the base from an upright position to a reclined position. The handle includes a tank tray and the tank tray has a tray base and a wall that extends upwardly from the tray base around a perimeter of the tray base. The tank tray also includes an inlet. A suction source is in fluid communication with the suction nozzle. The suction source is operable to draw fluid and dirt from the surface through the suction nozzle. A recovery tank is coupled to at least one of the base and the handle. The recovery tank is in fluid communication with the suction source to receive and store the fluid and dirt drawn through the suction nozzle. A distributor is in fluid communication with the distribution nozzle and with the inlet. The distributor is operable to distribute cleaning fluid to the surface through the distribution nozzle. A supply tank is removably coupled to the handle and the distributor. The supply tank is supported by the tank tray and is configured to receive and store the cleaning fluid. The supply tank includes an outlet in fluid communication with the inlet for supplying the cleaning fluid to the distributor. The handle includes a channel extending from the tank tray to direct fluid collected on the tank tray away from the supply tank and the recovery tank.

The wall of the tank tray can define a drain, and the channel can extend from the drain. The drain can be located adjacent a rear of the tank tray. When the handle is moved from the upright position to the reclined position, fluid collected in the tank tray can move toward the drain. The handle can include a groove communicating with the channel. The groove can extend generally downwardly and can diverge away from the handle. The tank tray can also include an inner wall extending upwardly from the tray base and spaced from the wall. The inner wall can surround the inlet. The inner wall can substantially divide the tank tray into a first volume defined between the inner wall and the wall and communicating with the drain, and a second volume defined by the inner wall and communicating with the inlet. The inner wall can substantially inhibit fluid collected within the first volume from reaching the second volume. The inner wall can define notches that allow fluid to flow over the inner wall. The wall of the tank tray can define a drain. The channel can extend from the drain, and the notches can be positioned higher than the drain. The distributor can be positioned directly below and in close proximity to the inlet.

In still other embodiments, the invention provides an extractor cleaning machine including a base movable along a surface to be cleaned and including a distribution nozzle and a suction nozzle. A handle is coupled to the base to facilitate movement of the base along the surface. The handle extends from the rear of the base and includes a tank tray that defines a volume. A suction source is in fluid communication with the suction nozzle. A recovery tank is coupled to at least one of the base and the handle. The recovery tank is in fluid communication with the suction source. A distributor is in fluid communication with the distribution nozzle. The distributor is operable to distribute cleaning fluid to the surface by way of the distribution nozzle. A supply tank is removably coupled to the handle and is at least partially supported by the tank tray. At least a portion of the supply tank is received by the volume, and the supply tank is in fluid communication with the distributor for supplying the cleaning fluid to the distributor. A channel communicates with and extends away from the volume for directing fluid away from the tank tray.

The tank tray can include a wall formed at a perimeter of the tank tray and defining a drain. The channel can extend from the drain in the wall toward a rear portion of the handle. The tank tray can also include an inlet providing fluid communication between the supply tank and the distributor, and an inner wall surrounding the inlet. The inner wall can substantially divide the tank tray into a first volume between the wall and the inner wall and communicating with the channel, and a second volume inside the inner wall and communicating with the inlet. The inner wall can define notches that allow fluid to flow over the inner wall. The notches can be positioned higher than the drain. The handle can include a groove communicating with the channel and extending generally downwardly and diverging away from the handle.

Before any embodiments of the invention are explained in detail, it is to be understood that the invention is not limited in its application to the details of construction and the arrangement of components set forth in the following description or illustrated in the above-described drawings. The invention is capable of other embodiments and of being practiced or of being carried out in various ways.

DETAILED DESCRIPTION

Figure 1:
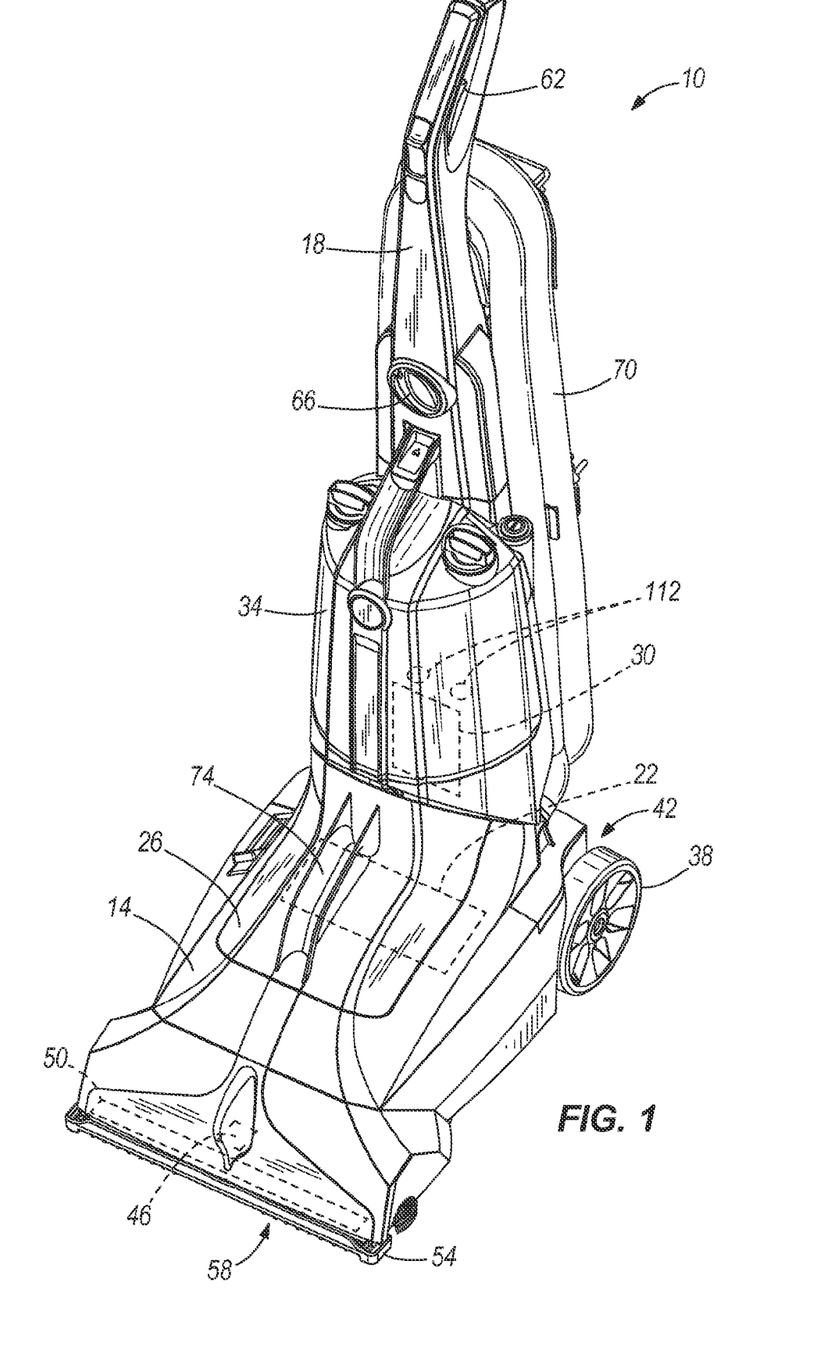
FIG. 1 is a perspective view of an extractor cleaning machine embodying the invention.

FIG. 1 illustrates an extractor-type surface cleaning machine 10 (herein referred to simply as an "extractor"). In the illustrated embodiment, the extractor 10 is an upright extractor operable to clean a surface, such as, for example, a floor. In some embodiments, the extractor 10 may be adapted to clean a variety of surfaces, such as carpets, hardwood floors, tiles, or the like. The extractor 10 distributes or sprays a cleaning fluid (e.g., water, detergent, or a mixture of water and detergent) onto the surface to clean the surface. The extractor 10 then draws the cleaning fluid and any dirt off the surface, leaving the surface relatively clean and dry.

The illustrated extractor 10 includes a base in the form of a foot 14 (other extractors, such as non-upright-type extractors, might have a different type of base), a handle 18 coupled to the foot 14, a suction source 22 supported by the foot 14, a recovery tank 26 coupled to the foot 14, a distributor 30 supported by the handle 18, and a supply tank 34 coupled to the handle 18. The foot 14 is movable along the surface to be cleaned and supports the other components of the extractor 10. Two wheels 38 (only one of which is shown in FIG. 1) are coupled adjacent a rear 42 of the foot 14 to facilitate movement of the foot 14 along the surface. In the illustrated embodiment, the wheels 38 are idle wheels. In other embodiments, the wheels 38 may be driven wheels.

As shown in FIG. 1, the foot 14 includes a distribution nozzle 46, a suction nozzle 50, and a brush assembly 54. In the illustrated embodiment the nozzles 46, 50 and the brush assembly 54 are supported adjacent a front 58 of the foot 14 opposite the rear 42 including the wheels 38. The distribution nozzle 46 is coupled to a lower surface of the foot 14 to direct cleaning fluid toward the surface. The suction nozzle 50 is also coupled to the lower surface of the foot 14 to draw fluid and dirt from the surface back into the recovery tank 26 of the extractor 10. The brush assembly 54 is coupled to the lower surface of the foot 14 adjacent the nozzles 46, 50 to scrub the surface. The brush assembly 54 also helps inhibit fluid from flowing beyond a periphery of the foot 14. In some embodiments, individual brushes of the brush assembly 54 may be electrically or pneumatically rotated to agitate and scrub the surface.

The illustrated handle 18 is pivotally coupled to and extends from the rear 42 of the foot 14. The handle 18 is pivotable or tiltable relative to the foot 14 from a generally vertical or upright storage position (as shown in FIG. 1) to an infinite number of non-vertical or reclined operating positions. Pivoting the handle 18 to one of the operating positions facilitates moving the foot 14 along the surface. The handle 18 supports a trigger 62 and a mode knob 66 to control operation of the extractor 10. The trigger 62 is actuatable to spray cleaning fluid from the supply tank 34 through the distributor 30 and the distribution nozzle 46 and onto the surface. The mode knob 66 adjusts the operating mode of the extractor 10. For example, the mode knob 66 may be rotated to control the amount of cleaning fluid distributed by the extractor 10 onto the surface. The illustrated handle 18 also supports an accessory hose 70. The accessory hose 70 is connectable to a variety of hand-held tools to help clean smaller surfaces, such as, for example, steps.

The suction source 22 is in fluid communication with the suction nozzle 50 to draw fluid and dirt from the surface through the nozzle 50. In one embodiment, the suction source 22 includes a fan that generates a vacuum to draw the fluid and dirt through the nozzle 50. In the illustrated embodiment, the suction source 22 is supported by the foot 14 generally underneath the recovery tank 26. In other embodiments, the suction source 22 may be supported by the handle 18 or may be positioned elsewhere on the extractor 10.

The recovery tank 26 is in fluid communication with the suction source 22 and the suction nozzle 50 to receive and store the fluid and dirt drawn through the nozzle 50. The illustrated recovery tank 26 is removably coupled to an upper surface of the foot 14. The recovery tank 26 includes a lift handle 74 to facilitate removing and handling the tank 26 apart from the extractor 10. In other embodiments, the recovery tank 26 may be supported by the handle 18 of the extractor 10.

The distributor 30 is in fluid communication with the distribution nozzle 46 to draw cleaning fluid from the supply tank 34 and distribute the fluid to the surface through the distribution nozzle 46. The illustrated distributor 30 draws cleaning fluid (e.g., water, detergent, or both) from the supply tank 34, mixes the cleaning fluid (if necessary), and distributes the cleaning fluid onto the surface. In one embodiment, the distributor 30 includes a pump that propels the cleaning fluid to the distribution nozzle 46. In the illustrated embodiment, the distributor 30 is supported by the handle 18 generally behind the supply tank 34. In other embodiments, the distributor 30 may be supported by the foot 14 or may be positioned elsewhere on the extractor 10.

The supply tank 34 is coupled to and supported by the handle 18. As such, the supply tank 34 is pivotable with the handle 18 relative to the foot 14. The supply tank 34 receives and stores cleaning fluid and supplies the cleaning fluid to the distributor 30. In the illustrated embodiment, the supply tank 34 is removably coupled to the handle 18 such that the supply tank 34 is only in fluid communication with the distributor 30 when the tank 34 is supported on the handle 18.

Figure 2:
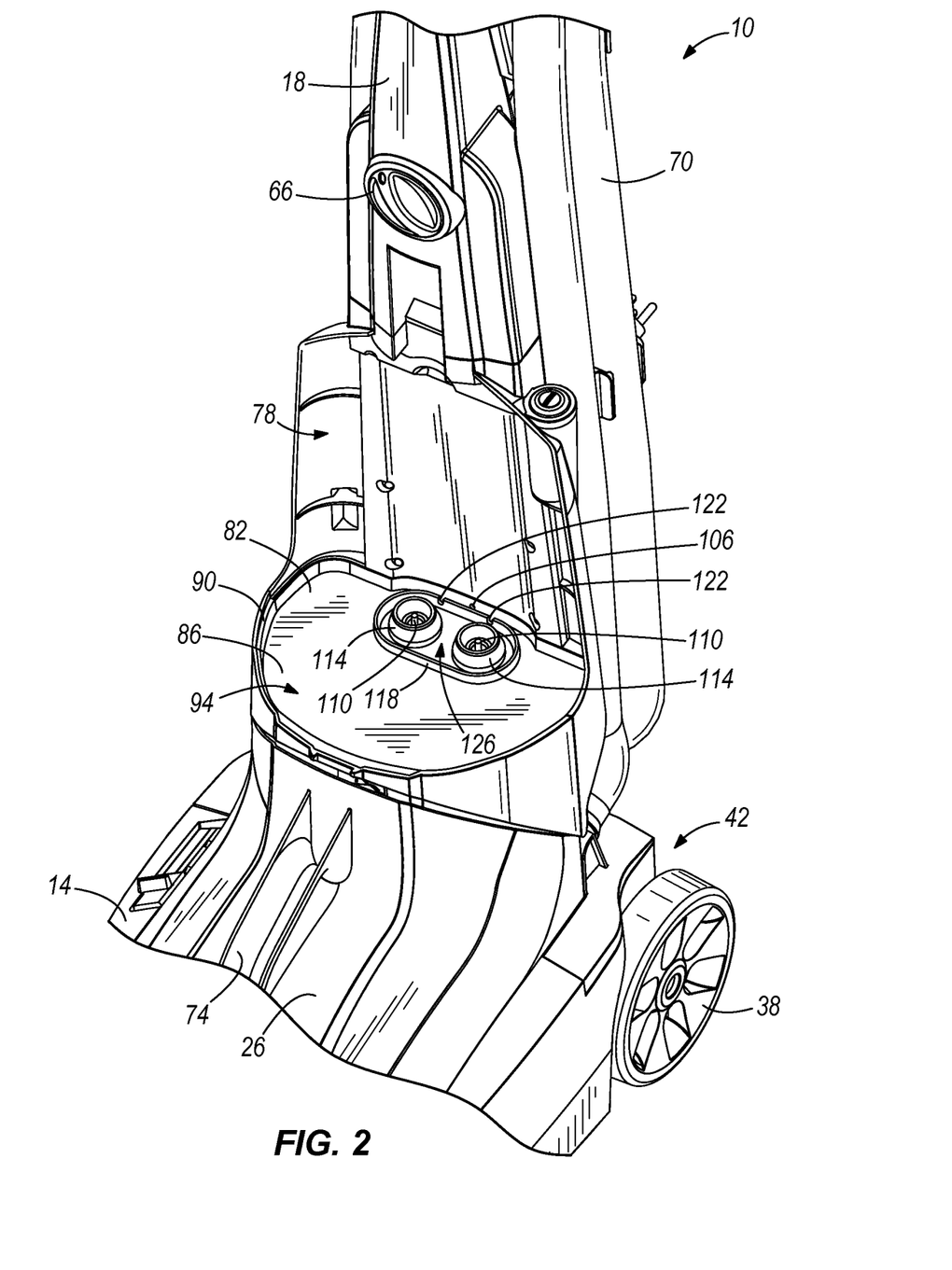
FIG. 2 is an enlarged perspective view of a portion of the extractor cleaning machine shown in FIG. 1, the extractor cleaning machine including a tank tray.

As shown in FIG. 2, the handle 18 defines a cavity 78 and includes a receptacle or tank tray 82 for receiving and supporting the supply tank 34 (FIG. 1). The tank tray 82 includes a tray base 86 and a wall 90 formed at a perimeter of the base 86. The wall 90, or lip, extends upwardly from the base 86 away from the foot 14. The base 86 and the wall 90 are shaped and sized to receive the bottom of the supply tank 34 such that a bottom portion of the supply tank 34 is received in a volume 94 defined by the wall 90 and the base 86. When the supply tank 34 is positioned on the tank tray 82, the wall 90 and the general shape of the cavity 78 cooperate to inhibit the supply tank 34 from shifting laterally relative to the handle 18. The wall 90 also retains spilt fluid collected on the tank tray 82 and inhibits the fluid from flowing uncontrollably off of the tray 82.

Figure 3:
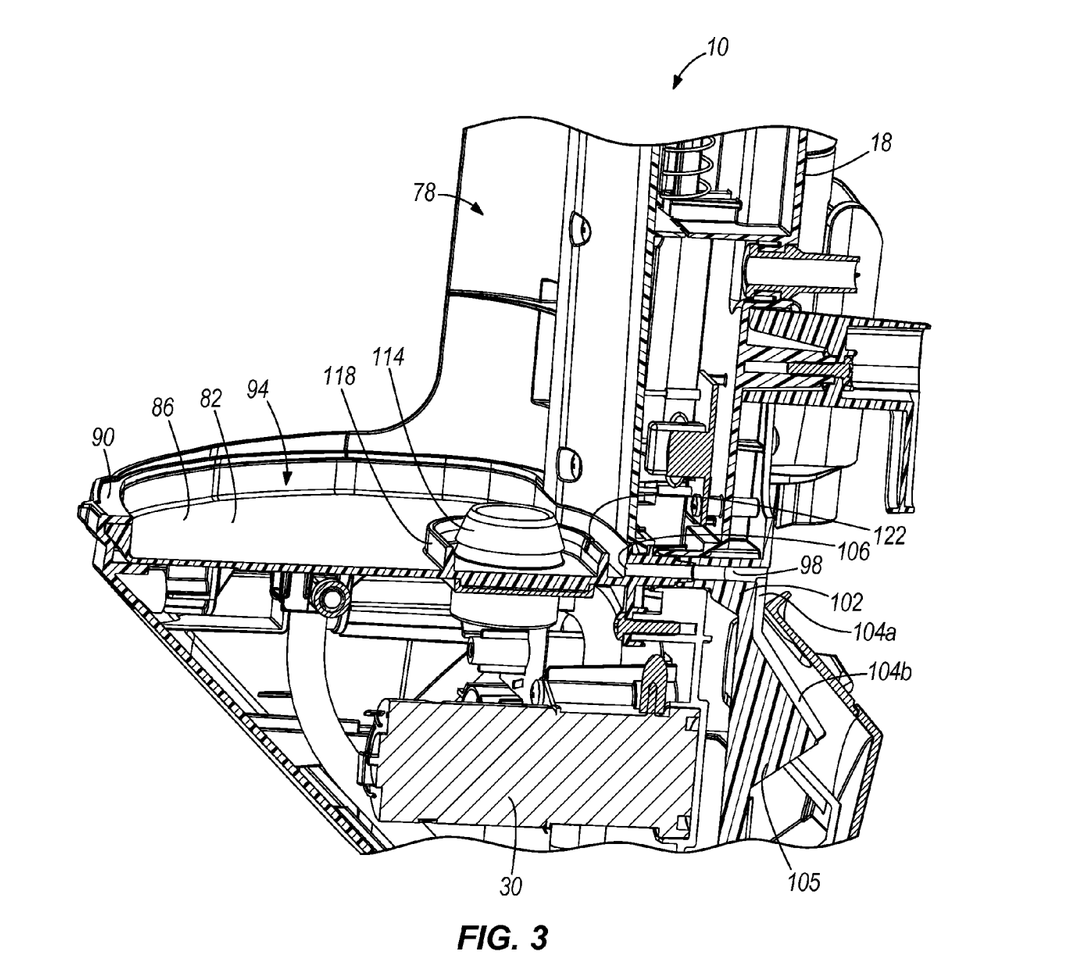
FIG. 3 is a cross-sectional view of a portion of the extractor cleaning machine shown in FIG. 1.
Figure 4:
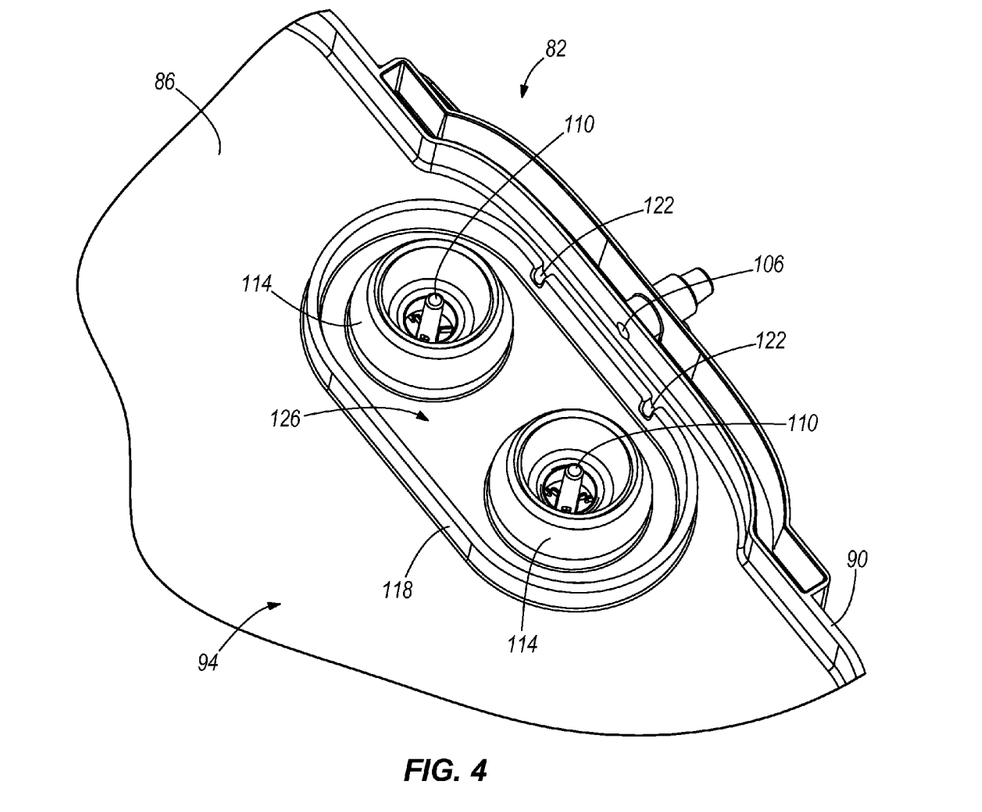
FIG. 4 is a top view of a portion of the tank tray.
Figure 5:
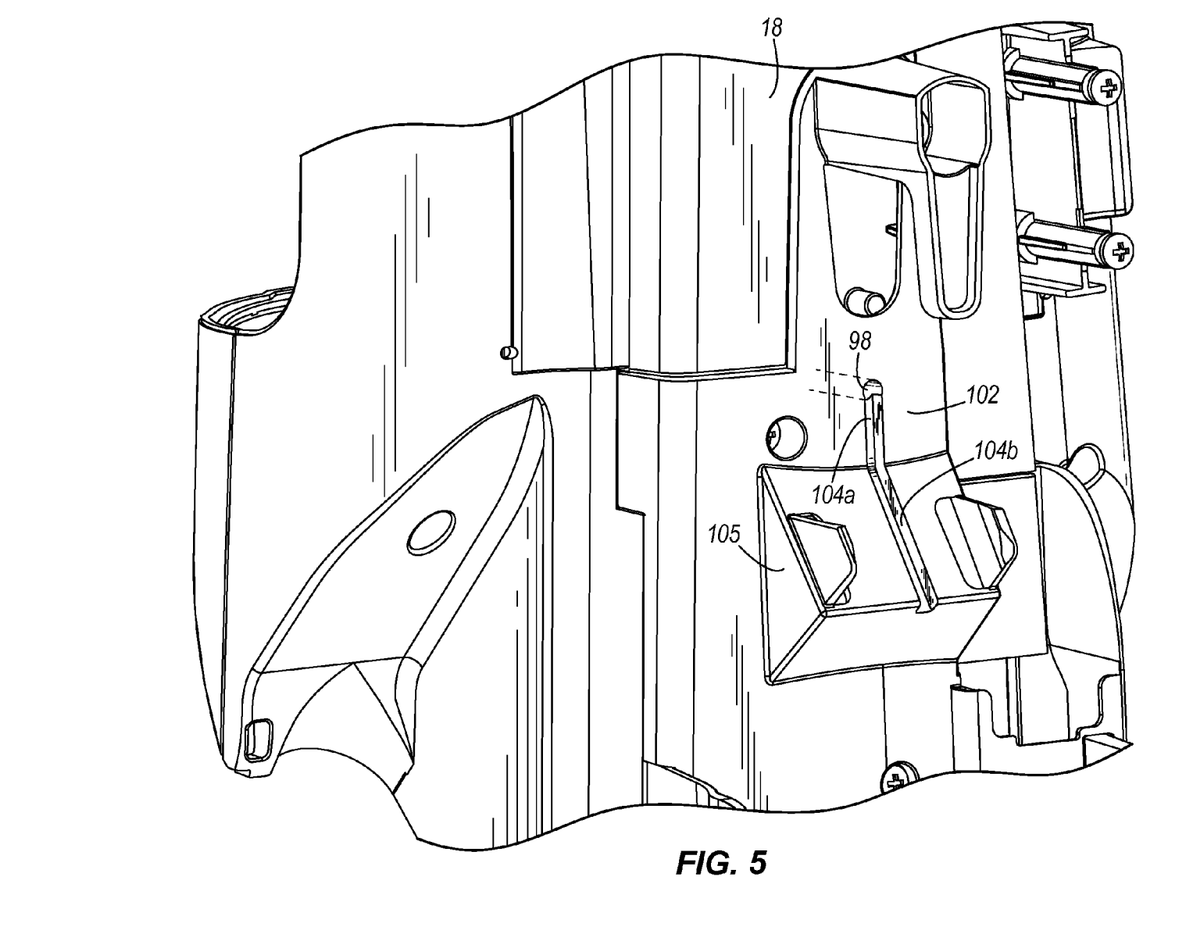
FIG. 5 is a rear perspective view of a portion of a handle of the extractor cleaning machine shown in FIG. 1.

As shown in FIGS. 3-5, the handle 18 includes a channel 98 positioned at the rear of the tank tray 82 and extending from the tank tray 82 to a rear panel 102 of the handle 18. The channel 98 opens to the rear of the handle 18 and communicates with a groove formed in the rear panel 102 and having a first groove portion 104a and a second groove portion 104b. When the handle 18 is in the upright position, the first groove portion 104a extends substantially vertically downwardly. The second groove portion 104b is defined by an angled ramp portion 105 of the rear panel 102 and diverges away from the handle 18 at an angle relative to the first groove portion 104a. The angled ramp portion 105 and second groove portion 104b cooperate to divert fluid away from the handle 18 in a controlled manner so that the fluid falls directly onto the surface to be cleaned rather than dribbling uncontrollably down the rear surface of the handle 18. In the illustrated embodiment, the channel 98 and the groove portions 104a, 104b are integrally formed with and defined by the handle 18. In other embodiments, the channel 98 and/or the groove portions 104a, 104b may include, for example, one or more separate tubes or conduits that are removably or permanently connected to the handle 18 and/or the tank tray 82.

The wall 90 defines a drain 106 positioned at the rear of the tank tray 82 and in communication with the channel 98 such that the channel 98 extends from the drain 106 to the rear panel 102. Because the drain 106 and the channel 98 are positioned toward the rear of the tank tray 82, when the handle is pivoted to a non-vertical or reclined operating position, fluid collected in the tray will tend to flow toward the drain 106 and the channel 98. In other embodiments, the drain 106 may be located elsewhere on the tank tray 82. Although not illustrated, the channel 98 can include or have coupled or connected thereto an additional conduit that carries or directs fluid to the foot 14, to the recovery tank 26, or to another location on the extractor 10 for either storage or distribution to the surface to be cleaned by the extractor 10.

As shown in FIGS. 2 and 4, inlets 110 of the distributor 30 (FIGS. 1 and 3) are supported by the base 86 of the tank tray 82. The inlets 110 couple to corresponding outlets 112 of the supply tank 34 (FIG. 1) to bring the tank 34 into fluid communication with the distributor 30. In the illustrated embodiment, the tank tray 82 includes two inlets 110. In other embodiments, the tank tray 82 may include fewer or more inlets. Each inlet 110 includes a rubber gasket 114 to inhibit fluid from leaking out of the supply tank 34 when the tank 34 is supported by the tank tray 82 and coupled to the inlets 110. In the illustrated embodiment, when the supply tank 34 is positioned in tank tray 82 it is supported at least in part by the rubber gaskets 114. In other embodiments, additional standoffs, projections, or other features may also or alternatively support the supply tank 34.

Fluid collected on the tank tray 82 during, for example, loading and unloading of the supply tank, flows through the drain 106 and the channel 98 to the first groove portion 104a and then to the second groove portion 104b. The drain 106, channel 98, and first and second groove portions 104a, 104b all cooperate to direct the fluid away from the supply tank 34, the recovery tank 26, and the internal components of the extractor 10 (e.g., the suction source 22 and the distributor 30) and toward the surface to be cleaned. As best shown in FIG. 3, because the tank tray 82 and drain 106 are configured to collect fluid spilt from the supply tank 34 during loading and unloading of the supply tank 34 and divert such fluid toward the rear of the handle 18, major electrical components such as the distributor 30 can be positioned directly below and in close proximity to the tank tray 82 and the inlets 110.

The illustrated tank tray 82 also includes a second, inner wall 118 that is spaced apart from the wall 90 and surrounds the inlets 110. The inner wall 118 is substantially continuous, positioned within the perimeter of the base 86, and extends upwardly from the base 86 away from the foot 14. The inner wall 118 inhibits fluid collected within the volume 94 defined by the wall 90 from reaching the inlets 110 and flowing into the distributor 30. More specifically, the inner wall 118 substantially divides the tank tray 82 into an outer volume comprising the volume 94, the outer volume being outside of the inner wall 118, and an inner volume 126 that is inside of the inner wall 118. The illustrated inner wall 118 includes an upper edge that defines notches 122 for allowing fluid collected within the inner volume 126 to flow over the wall 118 to the outer volume 94. As shown in FIG. 3, the notches 122 are positioned generally higher than the drain 106 such that fluid collected on the tank tray 82 will flow out through the drain 106 and the channel 98 instead of through the notches 122 and toward the inlets 110. In the illustrated embodiment, the inner wall 118 includes two notches 122. In other embodiments, the inner wall 118 may include fewer or more notches.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. An extractor cleaning machine comprising:
   a base movable along a surface to be cleaned;
   a handle pivotally coupled to the base for movement between an upright position and a reclined position, the handle including a tank tray having an inlet, the handle further including a channel communicating with the tank tray and extending through the handle from the tank tray to an outer surface of the handle;
   a distributor communicating with the inlet, the distributor operable to distribute cleaning fluid to the surface; and
   a supply tank removably coupled to the handle and having an outlet in fluid communication with the inlet when the supply tank is coupled to the handle, the supply tank at least partially supported by the tank tray, the tank tray configured to collect fluid spilt from the supply tank and to divert the fluid away from the tank tray to the outer surface of the handle by way of the channel.

2. The extractor cleaning machine of claim 1, wherein a drain is located adjacent a rear of the tank tray and communicates with the channel.

3. The extractor cleaning machine of claim 2, wherein when the handle is moved from the upright position to the reclined position, fluid collected in the tank tray moves toward the drain.

4. The extractor cleaning machine of claim 1, wherein the handle includes a groove communicating with the channel, the groove extending generally downwardly and diverging away from the handle.

5. The extractor cleaning machine of claim 1, wherein the tank tray further includes an inner wall surrounding the inlet.

6. The extractor cleaning machine of claim 5, wherein the inner wall is continuous and substantially divides the tank tray into a first volume outside of the inner wall and communicating with the channel, and a second volume inside of the inner wall and communicating with the inlet, and wherein the inner wall substantially inhibits fluid collected within the first volume from reaching the second volume.

7. The extractor cleaning machine of claim 5, wherein the inner wall defines notches along an upper edge of the inner wall that allow fluid to flow over the inner wall.

8. The extractor cleaning machine of claim 1, wherein the distributor is positioned directly below and in close proximity to the inlet.

9. An extractor cleaning machine comprising:
a base movable along a surface to be cleaned, the base including a distribution nozzle and a suction nozzle;
a handle coupled to the base to facilitate movement of the base along the surface, the handle pivotally coupled the base such that the handle pivots with respect to the base from an upright position to a reclined position, the handle including a tank tray and the tank tray having a tray base and a wall that extends upwardly from the tray base around a perimeter of the tray base, the tank tray also including an inlet;
a suction source in fluid communication with the suction nozzle, the suction source operable to draw fluid and dirt from the surface through the suction nozzle;
a recovery tank coupled to at least one of the base and the handle, the recovery tank in fluid communication with the suction source to receive and store the fluid and dirt drawn through the suction nozzle;
a distributor in fluid communication with the distribution nozzle and with the inlet, the distributor operable to distribute cleaning fluid to the surface through the distribution nozzle; and
a supply tank removably coupled to the handle and the distributor, the supply tank supported by the tank tray and configured to receive and store the cleaning fluid, the supply tank including an outlet in fluid communication with the inlet for supplying the cleaning fluid to the distributor;
wherein the handle includes a channel extending through the handle from the tank tray to an outer surface of the handle, and wherein the channel directs fluid collected on the tank tray away from the supply tank and the recovery tank and to the outer surface of the handle.

10. The extractor cleaning machine of claim 1, wherein the wall of the tank tray defines a drain, and wherein the channel extends from the drain.

11. The extractor cleaning machine of claim 10, wherein the drain is located adjacent a rear of the tank tray.

12. The extractor cleaning machine of claim 11, wherein when the handle is moved from the upright position to the reclined position, fluid collected in the tank tray moves toward the drain.

13. The extractor cleaning machine of claim 9, wherein the handle includes a groove communicating with the channel, the groove extending generally downwardly and diverging away from the handle.

14. The extractor cleaning machine of claim 9, wherein the tank tray further includes an inner wall extending upwardly from the tray base and spaced from the wall, the inner wall surrounding the inlet.

15. The extractor cleaning machine of claim 14, wherein the inner wall substantially divides the tank tray into a first volume defined between the inner wall and the wall and communicating with the drain, and a second volume defined by the inner wall and communicating with the inlet, and wherein the inner wall substantially inhibits fluid collected within the first volume from reaching the second volume.

16. The extractor cleaning machine of claim 14, wherein the inner wall defines notches that allow fluid to flow over the inner wall.

17. The extractor cleaning machine of claim 16, wherein the wall of the tank tray defines a drain, wherein the channel extends from the drain, and wherein the notches are positioned further from the base than the drain in a longitudinal direction of the handle.

18. The extractor cleaning machine of claim 9, wherein the distributor is positioned directly below and in close proximity to the inlet.

19. An extractor cleaning machine comprising:
a base movable along a surface to be cleaned, the base including a distribution nozzle and a suction nozzle;
a handle coupled to the base to facilitate movement of the base along the surface, the handle extending from the rear of the base and including a tank tray, the tank tray defining a volume;
a suction source in fluid communication with the suction nozzle;
a recovery tank coupled to at least one of the base and the handle, the recovery tank in fluid communication with the suction source;
a distributor in fluid communication with the distribution nozzle, the distributor operable to distribute cleaning fluid to the surface by way of the distribution nozzle; and
a supply tank removably coupled to the handle and at least partially supported by the tank tray, at least a portion of the supply tank being received by the volume, the supply tank in fluid communication with the distributor for supplying the cleaning fluid to the distributor; and
a channel communicating with the volume, the channel extending through the handle from the volume to an outer surface of the handle for directing fluid away from the tank tray and to the outer surface of the handle.

20. The extractor cleaning machine of claim 19, wherein the tank tray includes a wall formed at a perimeter of the tank tray, wherein the wall defines a drain, and wherein the channel extends from the drain in the wall toward a rear portion of the handle.

21. The extractor cleaning machine of claim 20, wherein the tank tray further includes an inlet providing fluid communication between the supply tank and the distributor, and an inner wall surrounding the inlet.

22. The extractor cleaning machine of claim 21, wherein the inner wall substantially divides the tank tray into a first volume between the wall and the inner wall, the first volume communicating with the channel, and a second volume inside the inner wall and communicating with the inlet.

23. The extractor cleaning machine of claim 21, wherein the inner wall defines notches that allow fluid to flow over the inner wall.

24. The extractor cleaning machine of claim 23, wherein the notches are positioned further from the base than the drain in a longitudinal direction of the handle.

25. The extractor cleaning machine of claim 19, wherein the handle includes a groove communicating with the channel, the groove extending generally downwardly and diverging away from the handle.

\* \* \* \* \*